United States Patent [19]

Bertz

[11] Patent Number: 4,841,644
[45] Date of Patent: Jun. 27, 1989

[54] METHOD AND SYSTEM OF TESTING GEAR TEETH OF CIRCULAR SPACING OF GEAR TEETH OF A GEAR WHEEL

[75] Inventor: Hans-Ulrich Bertz, Rastatt, Fed. Rep. of Germany

[73] Assignee: Ing. Willy Höfler, Karlsruhe, Fed. Rep. of Germany

[21] Appl. No.: 175,153

[22] Filed: Mar. 30, 1988

[30] Foreign Application Priority Data

Apr. 16, 1987 [DE] Fed. Rep. of Germany ....... 3712920

[51] Int. Cl.$^4$ ............................................ G01M 13/02
[52] U.S. Cl. ................................. 33/179.5 R; 33/556; 33/833
[58] Field of Search .................. 33/179.5 R, 179.5 D, 33/556, 558, 559, 560, 56.1, 199 R, 199 B; 73/162

[56] References Cited

U.S. PATENT DOCUMENTS

| 4,519,242 | 5/1985 | Hofler et al. |
| 4,610,091 | 9/1986 | Bertz et al. ........................ 73/162 X |
| 4,645,566 | 3/1987 | Hofler . |
| 4,646,443 | 3/1987 | Hofler . |

FOREIGN PATENT DOCUMENTS 3212081 10/1983 Fed. Rep. of Germany .

Primary Examiner—William D. Martin, Jr.
Attorney, Agent, or Firm—Frishauf, Holtz, Goodman & Woodward

[57] ABSTRACT

With the gear wheel (23) stopped, a testing head (13) is sequentially introduced into tooth gaps to measure adjacent teeth (FIG. 1a), sequentially, by sensing and recording the position of engagement of the measuring head with tooth flanks at a predetermined measuring circle, for example the pitch circle; the measuring head can move, with respect to the gear wheel, in X and Y vectorial directions, and if it is desired to also measure profile and/or inclination of inclined or spiraled gears, in the Z vectorial direction. The measuring head is moved from tooth gap to tooth gap until the end of a scanning range is reached. At that point, a control apparatus (24) rotates the gear wheel to place the last measured flank at least approximately at an initial measuring or reference position, so that the testing head can remeasure the last measured flank, thus determining the position of the gear wheel, and proceed with the next measuring cycle from tooth gap to tooth gap, while measuring the flanks. The various cycles will repeat until the gear wheel has rotated through a complete revolution. The measuring head (13) can remain in the tooth gap of the last measured flank upon rotation of the gear wheel to the reference position or can be withdrawn, and be moved independently, and simultaneously upon rotation of the gear wheel. All measurements are carried out while the gear wheel is stopped.

13 Claims, 2 Drawing Sheets

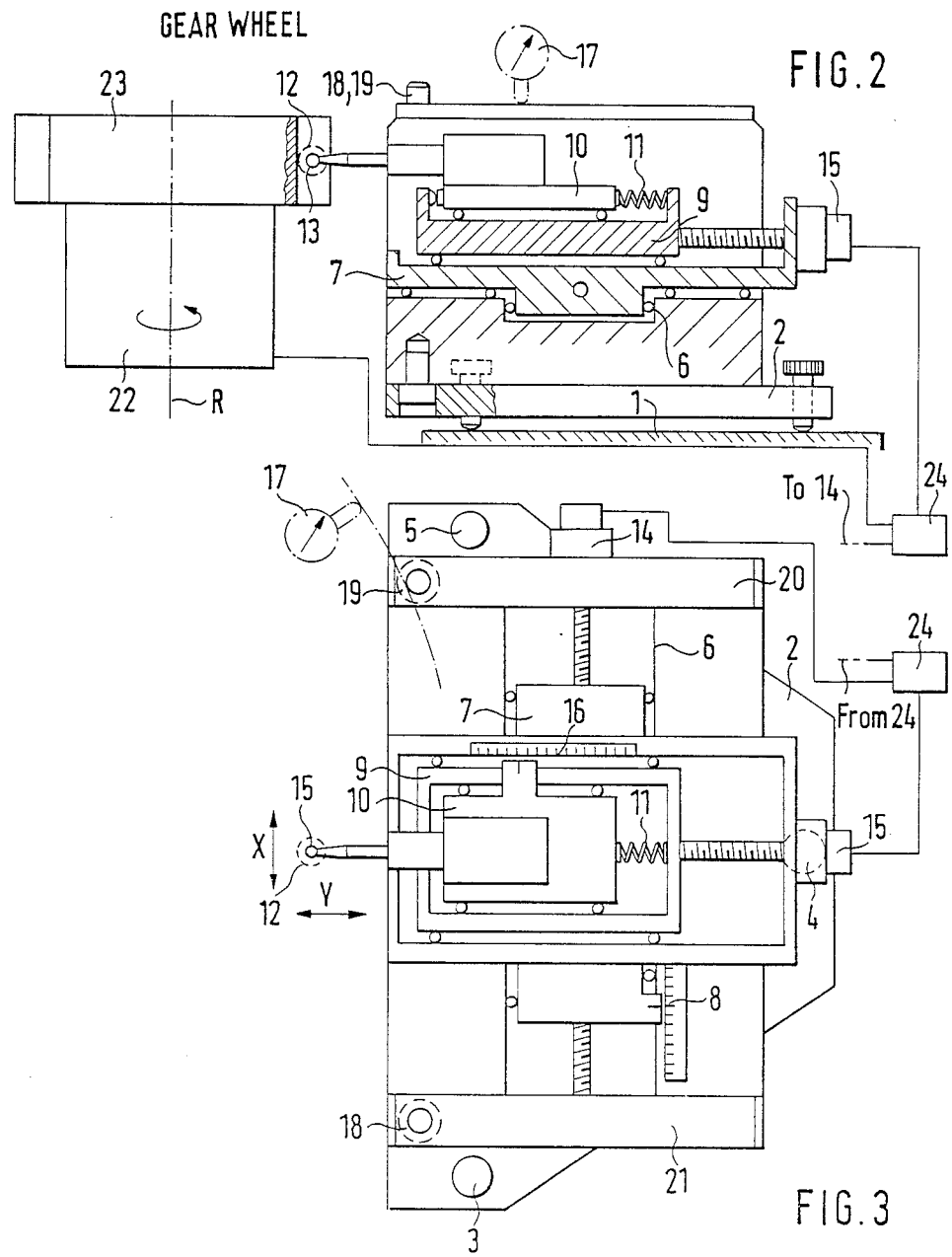

METHOD AND SYSTEM OF TESTING GEAR TEETH OF CIRCULAR SPACING OF GEAR TEETH OF A GEAR WHEEL

Reference to related patent, assigned to the assignee of the present application, the disclosure of which is hereby incorporated by reference:

U.S. Pat. No. 4,646,566, Höfler (to which German Patent Disclosure Document No. DE-OS 33 20 983 corresponds).

Reference to prior publications:
U.S. Pat. No. 4,519,242, Höfler et al
U.S. Pat. No. 4,646,443, Höfler
German Patent Disclosure Document No. DE-OS 32 12 079
German Patent Disclosure Document No. DE-OS 32 12 081.

The present invention relates to a method and to an apparatus to test gears, and more specifically to test the gear teeth and the spacing of the gear teeth of the gear wheel, particularly the pitch of large gear wheels.

BACKGROUND. Gear teeth and the spacing between gear teeth can be tested by test apparatus which, for example, may be portable, in which a sensing head is introduced into the gaps between gear teeth. The introduction into the gaps is at a specific level with respect to the center axis of the gear wheel, for example the pitch angle. The sensor is engaged with the flanks of the gear teeth. The sensor senses first the position of one flank, then the position of the opposite flank within a tooth. It is then withdrawn from the gap and introduced into the next gap, and the steps are repeated until the gear wheel, which rotates, has been tested over its entire circumference.

This testing process is suitable for small gears or for gears of intermediate size. The gear wheel is coupled to a precision angle measuring instrument, and measuring and testing is based on direct comparison of the angular position of the respective teeth with respect to the angle standard as determined by the angle measuring instrument. The angular subdivision of the angle measuring instrument permits positioning of the gear wheel in the respective desired angular alignment. A deviation of pitch or gear spacing is obtained by sensing the tangential deviation of the measuring sensor which is introduced into the tooth gap and engaged with the respective tooth flank which is to be tested. It has been found particularly desirable to use movable or oscillating measuring sensing heads, with the gear rotating continuously, and first test for example the left and then the right tooth flank, to be then withdrawn for testing of the next one. During one revolution of the gear wheel, deviation in position of the tooth gaps relative to the angle as defined by the standard or angle measuring instrument, and thus deviation from the tooth division and pitch, can be measured and recorded.

This testing system is, unfortunately, not accurate enough for large gears, since individual minor errors of the angle measuring instrument increase proportionately with the diameter of the gear to be tested.

To test large gears, it is customary to use test apparatus having two testing heads which simultaneously can be engaged against two respective flanks of teeth of the gear to be tested. In this connection, reference is made to earlier published technology, for example German Patent Disclosure Dcoument Nos. DE-OS 32 12 079 and 32 12 081.

THE INVENTION. It is an object to provide a method to test the pitch or division of gear teeth and gear tooth gaps, as well as the gear teeth themselves, which is suitable for large gear wheels utilizing only a single measuring head and which is fast and accurate and, preferably, can be used with existing measuring equipment with only minor modification thereof.

Briefly, during actual testing or sensing of the gear flanks, and hence of the tooth gaps, the gear is stationary. A plurality, usually sequential flanks, are tested with the single measuring head by introducing the sensing head sequentially between sequential teeth. Then, the measuring head is returned to its initial position and the gear wheel indexed so that a new measuring cycle for a plurality of teeth can begin, the indexing movement being so carried out that the sensing head engages the last measuring flank so that the gear wheel can be returned to a modified reference position at a new rotational angle, and then repeating the measuring steps of a plurality of gear teeth and tooth gaps in a subsequent cycle.

In accordance with the present invention, thus, the circumference of the gear wheel is effectively subdivided into a plurality of sequential circumferential regions. The spacing of the circumferential regions can be selected as desired, and may have such a value that the measuring sensor can just cover the respective gear teeth and gaps in one continuous cycle, with the gear being stopped in the particular circumferential range. Thereafter, the sensing head is returned to its initial position, preferably to its precise initial position, which may be a reference position. The gear wheel is then rotated, so that the next circumferential region or segment, which has not yet been tested, will come within the working range of the sensing head. The return movement of the sensing head and the rotation of the gear wheel over the circumferential portion, which may be termed a testing range, can be carried out either by withdrawing the sensing head or leaving the sensing head in the last testing tooth gap. It is preferred, however, to withdraw the sensing head first so that it can be moved back to an initial or starting or reference position independently of the gear and its rotational speed.

To permit the next subsequent measuring cycle to follow precisely the preceding measuring cycle, the sensing head is first engaged with one of the already measured flanks, preferably against the last measured flank of the preceding measuring cycle. Its new position—after rotation of the gear wheel over the measuring range—is determined. This also tests the return rotational angle of the gear wheel and permits ready association of the measuring data in the subsequent measuring cycle relative to the data of the first measuring cycle.

The entire gear wheel, thus, can be tested over its entire circumference intermittently. Test data derived from the sensing head, of course, can always be stored easily in suitable data storage memories.

The method has the substantial advantage that no angular measuring system determining a precise rotational position of the gear wheel is necessary. It is only necessary, rather, to determine the position of the sensing head. This is easily possible by linear measuring systems with an accuracy of 0.1 micrometer. Since only a single measuring head is needed, the requirement for components and structure is reduced, while increasing the accuracy of the measured data. Measuring is always carried out when the wheel is stopped, so that bounce effects, which are unavoidable is a dynamic or rotational measurement, between the measuring head and the rotating wheel, are avoided. The data derived can be easily stored and, further, processed. It permits calculation of any deviation from centricity of the gear teeth upon sensing of the thicknesses of the gear teeth and the width of the tooth gaps by simple calculations based on the data derived therefrom.

The method can be easily combined to additionally test the profile of the tooth flanks and, if the teeth are inclined or spiral gears, the angle of inclination of the teeth. Thus, all tests can be carried out by a single testing apparatus and during a single revolution of the gear.

The method can be carried out with known and existing apparatus. One such apparatus is described, for example, in U.S. Pat. No. 4,646,566, Hofler, to which German Patent Disclosure Document No. 33 20 983, corresponds which is used to test and determine the profile of gear flanks as well as the inclination of gear teeth. This apparatus can be used, modified only by the addition of apparatus and circuit and switching elements which, after one measuring cycle is carried out, control return of the measuring sensor to the starting or reference position and rotating or indexing the gear wheel about the measuring range angle, after a predetermined number of sequential flanks and tooth gaps have been sensed. After the predetermined number of flanks or tooth gaps has been measured and tested, the sensor will have reached the end of the measuring range. This is easily det rmined and the only additional apparatus necessary to modify known and existing apparatus is to return the measuring sensor to the reference position upon indexing of the gear wheel.

DRAWINGS, ILLUSTRATING AN EMBODIMENTS

FIG. 2 is a part-sectional, part-side view and part-schematic illustration of a test apparatus for carrying out the method of the present invention; and FIG. 3 is a part-sectional, partly cut-away top view of the apparatus of FIG. 2.

DETAILED DESCRIPTION

Figure 1A:
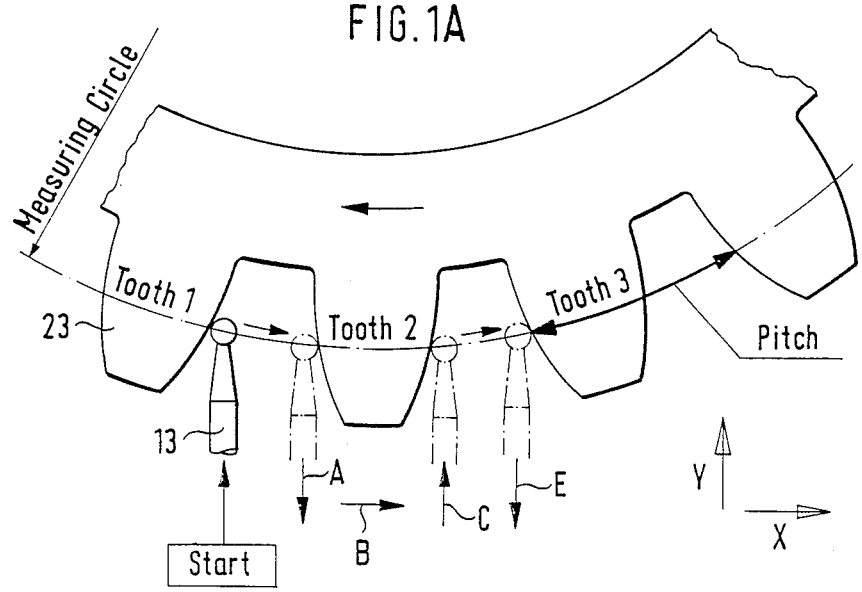
FIGS. 1a and 1b are schematic diagrams illustrating the sequence of steps in two sequential measuring cycles to measure gear teeth and tooth gaps in accordance with the method of the present invention.
Figure 1B:
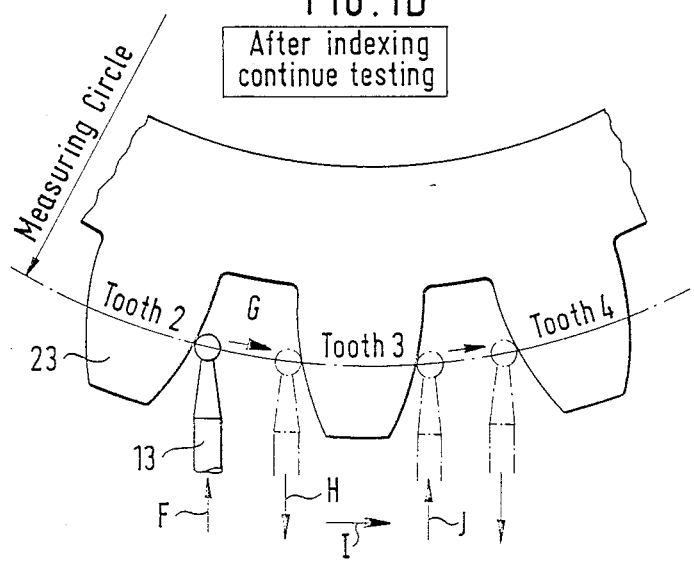

Referring first to FIGS. 1a and 1b: A position measuring sensor 13 is placed at a predetermined measuring circle, preferably the pitch circle of the gear wheel 23 which is to be tested. Gear wheel 23 is rotatably positioned on a suitable indexing support. The measuring sensor 13 is engaged at the left flank of tooth 1. "Left" and "right" is here used with reference to the center of the gear 23. A linear measuring system defining X and Y axes, shown schematically at the right of FIG. 1a, can then be set to a zero or reference position. It is, of course, also equally possible to measure resulting X and Y values and store the resulting data. The measuring sensor 13 is then moved both in the X and Y direction, until it engages the opposite flank, that is, the right flank of tooth 2 at the level of the measuring circle, here the pitch circle. The position of the measuring sensor, and, respectively, the deviation of the measured data with respect to computed or desired data, is determined and stored.

The measuring sensor is then pulled out of the tooth gap between the teeth 1 and 2, as indicated by the arrow A, moved along the teeth of the gear wheel as shown by the arrow B, and then reeintroduced into the tooth gap between the teeth 2 and 3 as indicated by the arrow C, at the level of the measuring circle, for engagement with the left flank of the tooth 2. Deviation of the pitch or division of the teeth of the left flank between the teeth 1 and 2 can thus be determned.

The sensor 13 is then moved in the direction of the arrow D, to the right in FIG. 1a, to be engaged against the right flank of the tooth 3. This measurement is representative of the pitch of the right flanks of the teeth 2 and 3; deviation from the desired or design pitch can thus be measured and stored.

The sensor 13 is then removed in the direction of the arrow E, which corresponds to the arrow A, and the measuring sequence can be repeated.

The measuring sequences are repeated until the scanning range, from left to right in FIG. 1a of the sensor 13, is exhausted, or at an end. In other words, the path in the X direction has reached the limit of sensor deflection. Depending on the pitch of the gear 23, three to seven teeth can be tested in that way. For simplicity, FIG. 1 is drawn to show that the path of the sensor 13 in the X direction is at an end already when engaging the right flank of tooth 3. The sensor 13 is withdrawn in the direction of the arrow E and returned in the X direction to the start or reference position. At the same time, the gear 23 is rotated or indexed so that the last measured flank, in this case the right flank of tooth 3, will reach the measuring or start position when the measuring sensor 13 is at the start or reference position. This, rotated position of the gear wheel 23 is illustrated in FIG. 1b. Return rotation of the gear 23 to be tested is carried out without reference to a specific accurate angle division rotation instrument. In accordance with a feature of the invention, the sensing head 13 itself is used at the beginning of the second measuring cycle to determine the new position of the gear wheel 23 after indexing rotation. In order to do so, the sensor 13 is engaged with a flank which had previously been tested, preferably, and for efficiency, the last tested flank, in the example the right flank of tooth 3. The angle of rotation of the gear teeth is determined by course positioning.

The gear wheel 23 is so rotated that the last measured right flank of the tooth 3 is rotated in the starting region of the sensor 1. This requires a rotary table which permits rotation of the gear wheel also over a non-whole-number multiple of the pitch.

In many installations, gear wheels are tested with a movable testing apparatus, in which the gear wheel is retained in the gear manufacturing machine, for example a hobbing machine. This permits remachining of any teeth which are found to be out-of-dimension without first having to remove the gear wheel from the gear manufacturing machine and then reinserting it. This means that the gear wheel is, as is customary, mounted on a turret or rotating table which can be rotated only about a whole-number integral of the pitch. This rotation is illustrated in FIG. 1b, in which the gear wheel is indexed by a whole gear tooth division in backward direction. The sensing element 13 is then removed from its starting position and introduced in the gap, see arrow F in FIG. 1b, and then moved in the direction of the arrow G so that it will engage the last measured flank, that is, the right flank of tooth 3, and measures its position. This measured position then corresponds to the new base position of the gear wheel 23 after indexing backwardly, and now is the known new base position. A new and second measuring cycle, utilizing this new base position as a reference, can begin. The flanks of the teeth 3 and 4 are scanned as shown; in actual practice, the flanks of substantially more teeth are scanned. The flanks of all the teeth are scanned until the sensor 13 is again at the far right position of its path of movement.

The measuring sensor 13, after determining the new base position, is then withdrawn, see arrow H, moved as shown by arrow I, and reintroduced in the gap between teeth 3 and 4, arrow J, and so on.

The cycles are repeated until the gear has been turned through one revolution.

The data which are obtained from engagement of the sensor 13 with the respective flanks of the teeth are data representative of single deviations of teeth from design or desired value as well as summed or overall errors in pitch or tooth division. Additionally, the data provide information regarding the thickness of the teeth and the width of the gaps between the teeth on the respective measuring circle, preferably the pitch circle. The data can easily be used to compute and indicate any deviations of the teeth or tooth gaps from centricity with respect to the theoretical axis of the gear 23.

The method can be carried out with apparatus which, in general, is known and used in the industry. It needs only small modifications. The apparatus is basically in FIGS. 2 and 3, to which reference will now be made.

The apparatus is portable, and located on a base table 1, for example of a gear hobbing machine. The test apparatus 2 is leveled by adjustment of three leveling screws 3, 4, 5, using, for example, a bubble gauge, as well known. The apparatus which, basically, is located on a frame or plate, has a carriage path 6, extending in the X direction (FIG. 1) which extends tangentially to the gear 23. Gear 23 is shown only schematically in FIG. 2. A first carriage 7 can be shifted in the carriage path 6. Preferably, the carriage 7 is retained on a ball guide. The shifting path or the shifted position, respectively, of the carriage 7 with respect to the apparatus base or frame 2, is sensed by an incremental distance measuring element or measuring transducer 8 (FIG. 3), which scans the shift or position data and transmits the so-scanned and sensed data to a computer or controller 24, for processing therein.

The carriage 7 has a second carriage 8 mounted thereon which is movable over a further longitudinal ball guide system in the Y direction. The second carriage 9, thus, can move the sensor 13 towards or away from the gear, that is, in the direction of the arrows A, C, E, F, H and J. The second carriage 9 carries a third carriage 10, again supported on the carriage 9 by a ball guide support which is retained by a spring 11 to move the sensing head 13 in the direction of the gear to be tested. The third carriage 10 carries the sensing head 13. Preferably, the sensing head 13 is at least in part surrounded by a course sensing element 12, forming a general orientation sensor.

The carriage 7 is moved by a positioning motor 14. The second carriage 9 is moved by a positioning motor 15. Both motors are controllable. An incremental measuring sensor or transducer 16 is located between the first and third carriages 7 and 10 in order to determine the position of the carriage 9 in the Y direction.

The measuring instrument is so positioned that its X axis and its Y axis each are perpendicular to the axis of rotation of the gear wheel 23. To properly position the measuring apparatus, two reference surfaces 20 and 21 are provided thereon. The measuring apparatus, and specifically its frame 2, has bolts 18 and 19 thereon which are perpendicular to the X and Y axes to permit tangential positioning of the measuring apparatus with respect to the gear wheel 23 and to locate the sensing element in the center of the tangent with the sensor 13 centrally positioned. Leveling and aligning the portable apparatus 2 can be checked by a rotary position indicator 17, for example magnetically secured to the gear wheel or otherwise attached thereto. This orients the apparatus 2 with respect to the gear wheel 23, and then the proper spacing between the apparatus 2 and the gear wheel 23, and specifically with respect to its axis of rotation R can be determined.

Of course, the sensing apparatus 2 can be leveled and aligned differently. It is also possible to use sensing apparatus which is not specifically leveled and aligned with respect to the gear but, rather, associate the apparatus 2 with the gear 23 in random manner and then calculate, in computer unit 24, the deviation of the apparatus 2 from a leveled and oriented position, for introduction as correction factors into the sensed data.

It is an important feature of the invention that the control and movement of the carriages in the X and Y direction is associated with a rotary drive 22 (FIG. 2) coupled to the gear 23 to be tested. Computer unit 24 provides associated or synchronized indexing movement of the gear 23 over the drive 22 in such a manner that each time when the sensing head 13 has exhausted its horizontal path distance, and the carriage 7 is to be returned to starting position, the rotary indexing drive 22 also indexes the gear 27 in the manner previously described, whereby automatically the new rotary position of the gear 23 can be determined by associating the last measured flank with the prior stored measuring result, so that the next measuring cycle may start.

Various changes and modifications may be made within the scope of the inventive concept. For example, sensing element 13 need not be moved in X and Y directions; rather, the sensing element 13 could be coupled to a telescoping sensing support, so that polar coordinates can be used, by sensing, respectively, axial extension of the sensing head 13 and angular deflection of the support arm thereof.

Most gear wheels which are being tested are spiral or inclined gears. The present testing method permits not only testing of the pitch or the gear tooth separation, and the profile of the gear teeth but, at the same time, also to test the inclination of the gear teeth. The test apparatus as described usually includes a further carriage, not shown, which is movable in the Z direction, that is, at right angles to the X and Y coordinates. This is a well known construction and since testing for inclination merely includes sensing deflection of in the other two directions, and three-dimensional triangulation, no further explanation is necessary.

The measuring system can be used both with external gears as well as with internal gears. The modifications to be carried out on the measuring unit 2, in order to test internal gears are well known and, therefore, no further description thereof is necessary.

Large gears as referred to herein are gears having a diameter in excess of about 1 meter.

The method and apparatus can, of course, also be used with smaller gears, but it is particularly suitable for such large gears.

I claim:

1. A method of testing gear teeth and the circular spacing of gear teeth and gaps between gear teeth of a gear wheel (23), particularly the pitch of large gear wheels, utilizing a testing apparatus (2) having a single testing head (13), comprising the steps of
   (a) positioning the testing head (13) at a reference position and placing the gear wheel opposite the testing head with a tooth gap facing the testing head;
   (b) with the gear wheel stopped; introducing the testing head into a facing tooth gap;
   (c) sensing and measuring the position of two flanks of teeth defining said facing tooth gap;
   (d) recording sensed and measured data;
   (e) withdrawing the testing head (13) from said facing tooth gap;
   (f) with the gear wheel still stopped, moving the testing head to an adjacent tooth gap;
   (g) repeating steps (b) to (f) until the testing head cannot be moved further to an adjacent tooth gap;
   (h) then returning said testing head to at least approximately the reference position;
   (i) rotating said gear wheel to a position in which the testing head, when at least approximately at the reference position, can be introduced into a tooth gap which is defined by at least one of the flanks sensed and measured in steps (b) to (g), to thereby determine the rotated position of the gear wheel (23); and
   (j) repeating the steps (b) to (i) until the gear wheel was moved through one revolution.

2. The method of claim 1, wherein step (i) comprises rotating the gear wheel to a position in which, upon the testing head (13), when introduced into the then facing tooth gap, will engage the last sensed and measured flank of a tooth.

3. The method of claim 1, further including the step of comparing the sensed, measured and stored data with design or desired data to determine, respectively, concurrence or deviation from data representing at least one of:
   width of tooth at a predetermined measuring circle of the gear;
   width of tooth gap at a predetermined measuring circle of the gear;
   deviation from centricity with respect to the axis of rotation of the gear.

4. The method of claim 1, further including the step of moving the testing head (13), while engaged with a flank of a tooth, in a direction which includes a vectorial component parallel to the axis of rotation (12) of the gear (23) to determine inclination of the flank of a tooth.

5. The method of claim 1, wherein step (c) is carried out by sensing and measuring the position of two flanks of the tooth at a predetermined measuring circle.

6. The method of claim 5, wherein said measuring circle is the pitch circle of the gear.

7. The method of claim 1, wherein said step (c) further includes moving the measuring head into and out of the tooth gap, while in engagement of a flank of a tooth, to determine the profile of the respective tooth.

8. The method of claim 1, further including the step of comparing the sensed, measured and stored data with design or desired data to determine, respectively, concurrence or deviation from data representing at least one of:
   width of tooth at a predetermined measuring circle of the gear;
   width of tooth gap at a predetermined measuring circle of the gear;
   deviation from centricity with respect to othe axis of rotation of the gear;
   angle of inclination of the teeth of a spiral or inclined tooth gear;
   gear tooth deviation at the pitch circle;
   profile shape of respective gear teeth.

9. The method of claim 1, wherein steps (h) and (i) are carried out simultaneously, with the testing head (13) remaining in position in the tooth gap in accordance with step (f).

10. The method of claim 1, including, after step (g), the step of
    withdrawing the testing head (13) from the tooth gap in accordance with step (f) and then carrying out step (h), with the testing head withdrawn; and
    wherein step (b) during the sequence of steps (j), comprises moving said testing head from a withdrawn position into the facing tooth gap.

11. The method of claim 9, wherein said steps (h) and (i) are carried out substantially simultaneously.

12. The method of claim 11, wherein said steps (h) and (i) are carried out essentially simultaneously and at different rates of speed.

13. Apparatus for testing the teeth of gears and tooth gaps between gear teeth of a gear wheel (23), particularly the pitch of large gear wheels, comprising a testing head (13);
    means (6, 9, 10) for moving the testing head into and out of tooth gaps, and for engaging said testing head with flanks of the gear teeth at predetermined radial positions of the gear teeth;
    means (24) for sensing and for recording the position of the measuring head (13) upon engagement with a tooth;
    and comprising
    control means (22, 24) sensing when the sensing head has reached a position at which it no longer can be introduced into a tooth gap, said means, then, controlling return of the sensing head to an initial or reference position and rotation of the gear wheel (23) by a distance corresponding at least approximately to the arcuate distance of the gear teeth which has been sensed and measured.

* * * * *